(12) United States Patent
Andersson

(10) Patent No.: US 7,943,233 B2
(45) Date of Patent: May 17, 2011

(54) WEB-LIKE OR SHEET-LIKE SEMI-FINISHED PRODUCT, POLYMERIC FOAM COMPOSITE MATERIAL AND PLATE AND METHOD FOR THE PRODUCTION THEREOF

(75) Inventor: David Andersson, Söråker (SE)

(73) Assignee: Andersson Composite Technologies AB, Söråker (SE)

( * ) Notice: Subject to any disclaimer, the term of this patent is extended or adjusted under 35 U.S.C. 154(b) by 31 days.

(21) Appl. No.: 12/225,974

(22) PCT Filed: Apr. 2, 2007

(86) PCT No.: PCT/SE2007/050209
§ 371 (c)(1),
(2), (4) Date: Oct. 3, 2008

(87) PCT Pub. No.: WO2007/114786
PCT Pub. Date: Oct. 11, 2007

(65) Prior Publication Data
US 2009/0169858 A1 Jul. 2, 2009

(30) Foreign Application Priority Data
Apr. 4, 2006 (SE) ...................................... 0600748

(51) Int. Cl.
*B32B 37/00* (2006.01)
*B32B 3/26* (2006.01)

(52) U.S. Cl. .................................. 428/304.4; 264/45.4

(58) Field of Classification Search ............... 428/297.4, 428/299.1, 299.4, 299.7, 318.4, 402, 304.4; 264/45.4
See application file for complete search history.

(56) References Cited

U.S. PATENT DOCUMENTS

| 4,432,825 | A | 2/1984 | Andersson et al. |
| 4,451,585 | A | 5/1984 | Andersson |
| 4,483,889 | A | 11/1984 | Andersson |
| 6,864,297 | B2 * | 3/2005 | Nutt et al. ........................ 521/54 |

FOREIGN PATENT DOCUMENTS

| DE | 102005060744 | 7/2006 |
| WO | 92/22420 | 12/1992 |
| WO | 97/29900 | 8/1997 |
| WO | 2005/002840 | 1/2005 |

* cited by examiner

*Primary Examiner* — Lynda Salvatore
(74) *Attorney, Agent, or Firm* — Dilworth & Barrese, LLP.

(57) ABSTRACT

A web-like or sheet-like semi-finished product capable of forming a polymeric foam composite material by heat treatment, which semi-finished product is formed by a web-like or sheet-like fibrous material and a mixture having curable resin and unexpanded thermoplastic particles of at least two different qualities with mutually different expansion temperature introduced into the fibrous material are provided, in which thermoplastic particles of at least one of these qualities remain unexpanded in the semi-finished product. A polymeric foam composite material is also formed by such a semi-finished product. Furthermore, methods for producing such a semi-finished product and such a polymeric foam composite material are provided.

20 Claims, 1 Drawing Sheet

WEB-LIKE OR SHEET-LIKE SEMI-FINISHED PRODUCT, POLYMERIC FOAM COMPOSITE MATERIAL AND PLATE AND METHOD FOR THE PRODUCTION THEREOF

FIELD OF THE INVENTION AND PRIOR ART

This invention relates to a polymeric foam composite material, which is particularly intended to be used for forming a layer in a plate. The invention also relates to a web-like or sheet-like semi-finished product capable of forming such a polymeric foam composite material by heat treatment. Furthermore, the invention relates to methods for producing such a polymeric foam composite material and semi-finished product, and a plate comprising at least one layer of such a polymeric foam composite material. The plate in question may be flat or compression-moulded and may be used for all kinds of surface-forming purposes. The plate may be used as a construction element intended to be coated with any suitable type of covering, but the plate may also be designed to form high-quality surface structures on its own in a variety of different connections.

Plates of polymeric foam materials have advantages by being able to combine low weight and good stability, insensitivity against moisture, good acoustical insulation, good heat insulation etc.

A foam composite material containing a fibrous material, resin and expanded thermoplastic particles, so-called microspheres, is previously known from EP 0 041 054 A2. The foam composite material according to EP 0 041 054 A2 is formed by a web-like fibrous material impregnated with a mixture of curable resin and unexpanded or expanded thermoplastic particles. When the thermoplastic particles are introduced into the web-like material in unexpanded-state, they are made to expand before a final hot pressing of the impregnated web-like material. In the foam composite material described in EP 0 041 054 A2, the thermoplastic particles have been allowed to expand freely or at least rather freely before the hot pressing and have thereby obtained thin shells and a low internal gas pressure. In connection with the hot pressing of the web-like material provided with expanded thermoplastic particles, the shells of the thermoplastic particles will be compressed, which results in an impaired pressure modulus and bending modulus of the pressed product. The low strength and large extension of the shells will also reduce the possibility of the resin of holding together the pressed product.

A foam composite material containing a fibrous material, resin and expanded thermoplastic particles is previously known from EP 0 647 182 B1. The foam composite material according to EP 0 647 182 B1 is formed by a web-like semi-finished product consisting of a web-like fibrous material impregnated with a mixture of curable resin and unexpanded thermoplastic particles. This semi-finished product is intended to be placed in a press device and to be subjected to heat and pressure in the press device so that final curing of the curable resin takes place and expansion of the thermoplastic particles takes place. A disadvantage with this production method is that the web-like semi-finished product with unexpanded thermoplastic particles has a small thickness and therefore often gives bad initial contact with the hot press surfaces of the press device, which results in a slow heat transfer from the press surfaces to the semi-finished product and thereby a long press time. A further disadvantage with this production method is that, in connection with the expansion of the thermoplastic particles in the press device, a large number of outwardly open cavities are formed about the thermoplastic particles that are expanding in the surface zone. The press surfaces prevent the air in these cavities from flowing away, and this entrapped air is compressed by the expanding thermoplastic particles, which results in a large number of surface pores and thereby an uneven surface structure of the pressed product.

Also through-going pores may ensue in the pressed product as a consequence hereof.

SUMMARY OF THE INVENTION

According to the invention, this object is achieved by means of a web-like or sheet-like semi-finished product having the features defined herein and a polymeric foam composite material having the features defined herein. The semi-finished product according to the invention is formed by a web-like or sheet-like fibrous material and a mixture comprising curable resin and unexpanded thermoplastic particles of at least two different qualities with mutually different expansion temperature introduced into the fibrous material, wherein thermoplastic particles of at least one of said qualities remain unexpanded in the semi-finished product. By including unexpanded thermoplastic particles of at least two different qualities with mutually different expansion temperature in the impregnating mixture, the impregnated web-like or sheet-like material can be heat treated under utilization of such a temperature that certain thermoplastic particles will expand whereas other thermoplastic particles remain unexpanded. The thermoplastic particles which remain unexpanded after the heat treatment can later on be made to expand in connection with a subsequent hot pressing of the semi-finished product under utilization of a temperature which is higher than the temperature during said heat treatment. Owing to the fact that said mixture comprises thermoplastic particles of different qualities with mutually different expansion temperature, it becomes possible in a simple manner by heat treatment to achieve a suitable ratio between unexpanded and expanded thermoplastic particles in the semi-finished product before a subsequent hot pressing and thereby give the semi-finished product suitable properties with respect to for instance the hot pressing process, such as for instance suitable fusibility and fluidity, and/or with respect to the desired properties of the product formed by the hot pressing. Owing to the fact that the thermoplastic particles are introduced into the fibrous material in unexpanded state, the introduction and dispersion of the thermoplastic particles in the fibrous material is also facilitated.

The different qualities of the thermoplastic particles which give the thermoplastic particles mutually different expansion temperature may for instance be achieved by using mutually different material compositions for the shells of the thermoplastic particles and/or by including mutually different expanding agents in the thermoplastic particles and/or by using thermoplastic particles of mutually different dimensions.

The invention also relates to a method for producing such a web-like or sheet-like semi-finished product having the features defined herein, and a method for producing a polymeric foam composite material having the features defined herein.

In this description and the subsequent claims, the expression "expansion temperature" refers to the temperature at which the expansion of an unexpanded thermoplastic particle is initiated, i.e. the temperature that has to be exceeded in order to make a thermoplastic particle change from unexpanded to expanded state. The expansion temperature of a thermoplastic particle is mainly determined by the softening temperature of the shell of the thermoplastic particle, but the properties of the expanding agent enclosed in the shell also has a certain influence on the expansion temperature. The expansion temperature of thermo-plastic particles can easily be adapted to a desired level by choosing different types of polymers or copolymers with different degree of cross-linking for the shells of the thermoplastic particles.

According to an embodiment of the invention, at least some of the thermoplastic particles in said mixture of a first quality has been made to expand after the introduction of the mixture into the fibrous material, whereas thermoplastic particles in the mixture of a second quality with higher expansion temperature than the thermoplastic particles of said first quality remain unexpanded in the semi-finished product. Hereby, it will for instance be possible to adjust the thickness of the web-like or sheet-like semi-finished product before the hot pressing by expansion of thermoplastic particles of said first quality so that the semi-finished product obtains a thickness suitable for the hot pressing process, for instance so that the semi-finished product already at the beginning of the hot pressing will come into contact with both of the opposite press surfaces of the press device so as to obtain a good heat transfer from the press surfaces to the semi-finished product and thereby make possible a short press time, at the same time as the advantages with an expansion of thermoplastic particles in connection with the hot pressing process are maintained.

Furthermore, surface roughnesses of the semi-finished product having unexpanded thermoplastic particles can be reduced by making some thermoplastic particles expand in the surface areas of the impregnated web-like or sheet-like material at the same time as other thermoplastic particles in the impregnated web-like or sheet-like material are left unexpanded, whereby the above-mentioned problem with formation of a large number of surface pores in the pressed product can be reduced at the same time as the advantages with expansion of thermoplastic particles in connection with the hot pressing process are maintained.

By making some thermoplastic particles expand and allowing other thermoplastic particles to remain unexpanded in the impregnated web-like or sheet-like material, the volume of the semi-finished product can easily be adjusted so as to for instance achieve optimal conditions when the semi-finished product is to be used in order to fill up cavities and smooth out the surface of a product. By achieving a suitable adjustment of the volume of the semi-finished product in this manner, the semi-finished product can, when it is placed in a cavity of the product, be made to press out the main part of the air that is present in the cavity so that the risk of entrapped air is reduced in connection with the subsequent hot pressing of the semi-finished product placed in the cavity, at the same time as the advantages with expansion of thermoplastic particles in connection with the hot pressing process are maintained.

According to an embodiment of the inventive method for producing the web-like or sheet-like semi-finished product, the stickiness of the external surfaces of the impregnated web-like or sheet-like material is reduced in that thermoplastic particles of said first quality are made to expand in the areas closest to the external surfaces of the impregnated web-like or sheet-like material. Due to the reduced stickiness, the handling of the impregnated web-like or sheet-like material is facilitated, for instance in connection with a subsequent drying thereof.

Further features and advantages of the invention will appear from the dependent claims and the subsequent description.

The invention also relates to a plate having the features defined herein and a method for producing a plate having the features defined herein.

BRIEF DESCRIPTION OF THE DRAWING

The invention will in the following be more closely described by means of embodiment examples, with reference to the appended drawing. It is shown in.

DETAILED DESCRIPTION OF PREFERRED EMBODIMENTS

Figure 1:
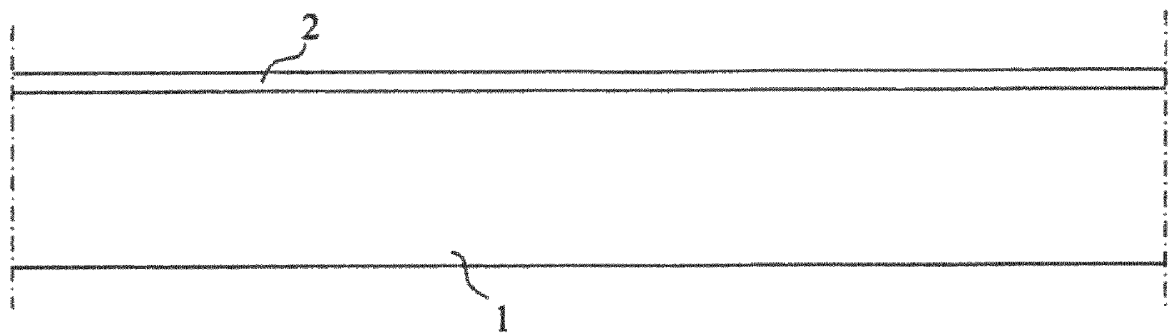
FIG. 1 a cut though a plate according to an embodiment of the present invention.

The plate illustrated in FIG. 1 is of compound structure and comprises at least a first layer 1 comprising a polymeric foam composite material according to the present invention. Furthermore, the plate comprises a second layer 2 constituting a surface layer of the plate. The plate could of course be provided with surface layers 2 on both sides of the layer 1 of polymeric foam composite material.

The surface layer 2 may be of a plastic material, for instance glass fibre reinforced plastic, or of metal, for instance aluminum or an alloy thereof.

The polymeric foam composite material in the first layer 1 comprises cured resin, a fibrous material and a thermoplast in the form of expanded particles, so-called microspheres. It is pointed out that this foam composite material also may contain spheres of organic or inorganic material, for instance glass. Between 1 and 10% by weight of the foam composite material could consist of such glass spheres.

The foam composite material in the first layer 1 suitably has a density in the range of 30-1000 kg/m$^3$. A preferred range in this respect is 70-500 kg/m$^3$.

The foam composite material is formed by a web-like or sheet-like semi-finished product, which in its turn is formed by a web-like or sheet-like fibrous material, which in connection with the production of the semi-finished product has been impregnated with a mixture comprising curable resin and unexpanded thermoplastic particles of at least two different qualities with mutually different expansion temperature.

The web-like or sheet-like fibrous material may be woven or non-woven and may comprise organic or inorganic fibres, such as for instance glass fibres, mineral fibres, cellulose fibres, carbon fibres, aramid fibres, natural fibres, Kevlar fibres or polyester fibres. It is important that the web-like or sheet-like material has a sufficient porosity so as to be capable of being impregnated with the mixture of curable resin and unexpanded thermoplastic particles in a satisfactory manner. In order to make the web-like or sheet-like material easy to dry and handle, when regarded as an individual layer, this material suitably has a thickness between 0.1 and 50 mm, preferably between 0.3 and 20 mm. During the production of the plate in a hot press or the similar, several individual layers of the above-mentioned semi-finished product may be combined with each other and with desired further layers. The web-like or sheet-like fibrous material, as seen in its initial state, suitably has a weight of 20-6000 g/m$^2$, preferably 30-3000 g/m$^2$. The semi-finished product suitably comprises 10-70% by weight, preferably 15-60% by weight, of fibres.

The resin included in the impregnating mixture may be solvent-based resin or resin which is solvent free or only has a low solvent content but is liquid at room temperature or at a slightly increased temperature. The curable resins which preferably come in question are so-called formaldehyde-based resins with carbamide, phenol, resorcinol or melamine, or with a mixture of some of these materials. However, also other types of curable resins may be used, such as polycondensated resins, for instance polyimide, poly-added resins, for instance polyurethane, and radical-polymerized resins, for instance polyester. Also acrylic resins may be used.

In order to form the impregnating mixture, unexpanded thermo-plastic particles of at least two different qualities with mutually different expansion temperature may be added to curable resin that is in liquid state. The thermoplastic particles may be added to the resin solution in the form of dry or wet particles or in a suspension, for instance in water or an alcohol, such as methanol. It is also possible to provide the resin as granulate and mix the unexpanded thermoplastic particles with the granulate and then form the impregnating mixture by heating the mixture of the unexpanded thermoplastic particles and the granulate to a temperature above the melting point of the resin but below the expansion temperature of the unexpanded particles.

In the following description, the terms A stage, B stage and C stage will be used as to the curable resin included in the semi-finished product and foam composite material according to the invention. The meaning hereof is that a curable resin which is in the A stage is meltable, insignificantly cross-linked and usually soluble in acetone and other solvents. A resin in the C stage is unmeltable, completely cross-linked and insoluble. The B stage indicates a stage between the A stage and the C stage.

The thermoplastic particles used for the production of the web-like or sheet-like semi-finished product have shells which can be formed of polymers or co-polymers, such as for instance co-polymers of vinyl chloride and vinylidene chloride, co-polymers of vinyl chloride and acrylonitrile, co-polymers of vinylidene chloride and acrylonitrile, co-polymers of styrene and acrylonitrile, co-polymers of methylmethacrylate containing up to about 20% by weight of styrene, co-polymers of methylmethacrylate containing up to about 50% by weight of combined monomers of ethylmethacrylat, or co-polymers of methylmethacrylate containing up to about 70% by weight of ortho-chlorostyrene. The particle size of the unexpanded spheres, and accordingly of the expanded spheres, may vary within wide limits, and is suitably chosen based on the desired properties for the final product. The particle size of the unexpanded thermoplastic particles may for instance be 1 μm to 1 mm, preferably 2 μm to 0.5 mm, and particularly preferred 5 μm to 50 μm. During the expansion, the diameter of the thermoplastic particles increases by a factor of about 1-10. The unexpanded thermoplastic particles contain volatile, liquid expanding agents which are evaporated in connection with the supply of heat. These expanding agents may be freons, hydrocarbons, such as n-pentane, i-pentane, neopentane, butane, i-butane or other expanding agents which are conventionally used in thermoplastic particles of the kind here mentioned. 5-30% by weight of the thermoplastic particle may suitably be constituted by expanding agent.

In connection with the production of the semi-finished product according to the invention, a web-like or sheet-like fibrous material is impregnated with a mixture comprising curable resin and unexpanded thermoplastic particles of at least two different qualities with mutually different expansion temperature. Suitably 0.1-70% by weight, preferably 0.5-50% by weight, of the total amount of thermoplastic particles in said mixture are thermoplastic particles of a first quality having a lower expansion temperature than the rest of the thermoplastic particles in the mixture. If so considered suitable, said mixture may comprises unexpanded thermoplastic particles of three or more different qualities with mutually different expansion temperature.

The ratio of resin/thermoplastic particles in said mixture may vary within wide limits, and this ratio affects the properties of the final product. Inversely, with a certain application area and certain desired properties of the final product in view, a suitable ratio of resin/thermoplastic particles in the mixture can be chosen. This ratio can easily be established by preparatory tests in laboratory scale. The web-like or sheet-like semi-finished product suitably comprises 0.1-80% by weight, preferably 3-50% by weight, of thermoplastic particles.

The mixture of resin and thermoplastic particles may, if so desired or required, be provided with different additives, such as stabilizers, couplers, fillers, fire-retarding additives and/or pigments. Particles or spheres of organic or inorganic material, for instance glass, may also be added to the mixture of resin and thermoplastic particles.

After the introduction into the fibrous material of the mixture comprising curable resin and unexpanded thermoplastic particles of at least two different qualities with mutually different expansion temperature, during which introduction the unexpanded thermoplastic particles are distributed in the fibrous material, the resin is cured and the thermoplastic particles are expanded for the formation of the foam composite material. A semi-finished product of the foam composite material is produced in a first operation and this semi-finished product is then in a second operation combined in a suitable number of layers in order to achieve the layer 1 of the plate illustrated in FIG. 1.

After the introduction of said mixture into the web-like or sheet-like fibrous material, this may, if so considered suitable, be treated in such a manner that the curable resin is in the B stage in the semi-finished product, whereas thermoplastic particles of at least one of said qualities remain unexpanded in the semi-finished product. The semi-finished product according to the invention has such a character that it is transformable by heat treatment into a foamed composite material with rigid structure. During such a heat treatment, a final curing of the resin takes place so that this is made to change into the C stage at the same time as a remaining expansion of the thermoplastic particles takes place. If so considered suitable, all thermoplastic particles may remain unexpanded in the semi-finished product, in which case thermoplastic particles of a first quality can be made to expand before a hot pressing of the semi-finished product and the remaining thermoplastic particles can be made to expand during the hot pressing. It is also possible to let thermoplastic particles of different qualities with mutually different expansion temperature expand at different points of time during a hot pressing of the semi-finished product.

A closer description of a manner of producing the above-described foam composite material follows below. This described method of production only constitutes a non-limiting example.

A pre-condensate of water-based curable resin is produced in a conventional manner, and the water content is adjusted so as to obtain a dry content of 30 to 75% by weight. The solution thus obtained is provided with unexpanded thermoplastic particles, so-called microspheres, of two or more different qualities with mutually different expansion temperature to such an extent that the weight ratio thermoplastic particles: resin in the pressed foam composite material varies between 4:1 and 1:50. It is advantageous to let the thermoplastic particles be included in such an amount that they in expanded state constitute 5-98, preferably 60-95% by volume, of the web-like or sheet-like material and the resin mixture. The web-like or sheet-like material is impregnated with the mixture of resin and thermoplastic particles in a conventional manner, for instance by immersing the web-like or sheet-like material into a bath containing the mixture or by spraying the mixture onto the web-like or sheet-like material. The degree of impregnation of the impregnated web-like or sheet-like material may for instance be adjusted by pressing with the aid of rolls.

The impregnated web-like or sheet-like material is suitably subjected to heat so that this material, at least in the areas closest to its external surfaces, reaches a temperature which exceeds the expansion temperature of the unexpanded thermoplastic particles in said mixture of a first quality and which is lower than the expansion temperature of the unexpanded thermoplastic particles in the mixture of a second quality with higher expansion temperature than the thermoplastic particles of said first quality, so that at least some of the thermoplastic particles of said first quality are made to expand, whereas thermoplastic particles of said second quality remain unexpanded.

After a possible drying to a solvent content of preferably 0-40% by weight, the semi-finished product may be arranged for the hot pressing to be executed in a later operation. In this connection, the semi-finished product may for instance be wound up to form rolls for transportation or storage or be piled up in sheet-shape. By letting thermoplastic particles of said first quality expand before the drying, the structure of the impregnated web-like or sheet-like material is loosened so that the evaporation of the solvent during the drying process is facilitated.

Then, in order to achieve the above-mentioned layer 1, the semi-finished product is positioned in a required number of layers, together with further possible material layers, in a press device in the form of a hot press or the similar, and the combination is there subjected to heat and pressure so that final curing of the curable resin takes place and remaining expansion of the thermoplastic particles takes place. In this connection, an interconnection of the foam composite material to other possibly present material layers also takes place.

During the hot pressing, a porous material layer may, if so desired, be applied on one or both sides of the semi-finished product. It is hereby also included that said porous material layer could be located between two layers of the semi-finished product. The definition "porous material layer" here implies that this material layer is to have such openings or cavities that it allows a partial penetration of the resin mixture into the porous material layer when the thermoplastic particles expand and allows a departure of solvent along and/or through the porous material layer. In practice, the porous material layer may be some type of fibrous layer or fibrous web, for instance a woven or non-woven, organic or inorganic fibre material. Here, the term "fibrous web" includes so-called fibre felt mats or felt mats, for instance made of glass or mineral. As examples of suitable materials for the porous material layer glass fibre, mineral fibre, cellulose fibre, plastic fibre, natural fibre, metallic fibre and polyester fibre may be mentioned. Particularly advantageous alternatives in this connection are to make the porous material layer of glass wool or mineral wool.

Alternatively, the porous material layer may be constituted by a so-called expanded metal, namely a net-like metal structure formed by one single integral metal piece. In such an expanded metal, there are connecting bridges which are more or less oblique in relation to the main plain of the expanded metal layer. Within such bridges, the expanded metal layer has through openings. Accordingly, the expanded metal layer allows a departure of solvent through the openings of the expanded metal layer, and the solvent may also depart parallelly to the expanded metal layer as a consequence of the openings and cavities which are present in connection with the expanded metal layer.

A further alternative of porous material layer is a foam layer, for instance made of melamine foam or polyester foam. Such a foam layer may be positioned on one side of the semi-finished product during the hot pressing. Such a foam layer could also, during the hot pressing, be positioned between layers formed by the semi-finished product. A foam plastic of relatively soft character is with advantage chosen as foam plastic. The density of the foam plastic may for instance be chosen to be about 200 kg/m$^3$ or less. However, the density of the foam plastic should with advantage be chosen to be about 5 kg/m$^3$ or more. Particularly favourable results have been obtained with foam plastics with a density between 5 and 80 kg/m$^3$.

When glass wool or mineral wool is used for the porous material layer, the density is with advantage chosen to be somewhere between 50 and 300 kg/m$^3$, between 100 and 200 kg/m$^3$ being particularly preferable. The combination of the semi-finished product and said porous material layer may be positioned in a hot press or the similar and is there subjected to heat so that the possibly remaining solvent content is evaporated and the still unexpanded thermoplastic particles are expanded.

The porous material layer and the impregnated web-like or sheet-like material are suitably so designed or chosen that a partial penetration of the resin mixture into the porous material layer takes place when the thermoplastic particles expand. Thereby, a good mutual interconnection between the resin mixture, the web-like or sheet-like material and the porous material layer is obtained.

Above, it has been described for an exemplifying purpose how it is possible to combine the semi-finished product with further porous material layers in connection with the hot pressing of the semi-finished product. However, it should be noted that such porous material layers are not necessary. On the contrary, the hot pressing may take place with several layers of semi-finished product, each of which consisting of an impregnated web-like or sheet-like material, and possible further, non-porous layers. Such an embodiment is particularly favourable when the solvent content in the semi-finished product before the hot pressing has been adjusted, preferably by means of drying, to a value within about 5-25% by weight.

The curing of the curable resin takes place in the press device in one and the same stage as the evaporation of possibly remaining solvent and the final expansion of the thermoplastic particles. When the semi-finished product comprises thermoplastic particles of a first quality which have been made to expand before the hot pressing and thermoplastic particles of a second quality which remain unexpanded, the time order may suitably be such that the solvent evaporation and the remaining expansion of the thermoplastic particles take place approximately simultaneously, whereas the final curing of the curable resin takes place subsequently at an increased temperature. When the semi-finished product comprises thermoplastic particles of at least two different qualities with mutually different expansion temperature which remain unexpanded before the hot pressing, the time order may be such that the solvent evaporation and the expansion of thermoplastic particles of a first quality take place approximately simultaneously, whereas the final curing of the curable resin and the remaining expansion of the thermoplastic particles take place subsequently at an increased temperature.

The semi-finished product consisting of the impregnated web-like or sheet-like material and possible further material layers is suitably positioned in the hot-press device, which is then closed, possibly to a given gap width. Alternatively, the semi-finished product and possible further material layers are positioned in a vacuum press, which is then subjected to heating. The subsequent expansion of the still unexpanded thermoplastic particles gives rise to such a volume increase that a pressing effect ensues between the press surfaces without having to move the press surfaces closer to each other. The temperature in the press device may be between 100 and 200° C., preferably 120-160° C., during the treatment of the semi-finished product.

As already mentioned, one purpose of the porous material layer, when being present, is to act in such a manner that solvent can depart along and/or through the material layer. Moreover, the porous material layer may also have other functions. More precisely, it may simply act as a layer for accomplishing a distance in different sandwich-like composite materials. The porous material layer may also have the character of a cost-reducing filler.

In a possible embodiment, in which semi-finished product layers are positioned on opposite sides of a porous material layer, the porous material layer, the semi-finished product and the heat and pressing conditions are so chosen that the curable resin and/or the thermoplastic form/forms connecting bridges through the porous material layer. Such connecting bridges between the layers of the semi-finished product located on opposite sides of the porous material layer implies a more stable interconnection between the layers of semi-finished product than the interconnection that could be achieved by the porous material layer on its own. Hereby improved mechanical strength properties are obtained, for instance with respect to the rigidity of the obtained foam composite material, but above all with respect to the resistance against splittering of the composite along the porous material layer. Particularly when it comes to compressible, porous material layers, the connecting bridges also imply a larger resistance against compaction of the porous material layer. The connecting bridges are particularly favourable in such cases where the porous material layer is constituted by foam plastic or another material which is relatively soft or has a low density, but where good strength properties are desired despite such softness or low density.

A non-limiting example of the production of a semi-finished product and a polymeric foam composite material according to the invention follows below.

A glass felt mat with a weight of 55 g/m$^2$ was impregnated with a mixture of phenol resin and unexpanded thermoplastic particles of two different qualities with expansion temperatures of 80° C. and 90° C., respectively, to the formation of an impregnated mat with 155 g/m$^2$ phenol resin, 1 g/m$^2$ unexpanded thermoplastic particles of a first quality with an expansion temperature of 80° C. and 12 g/m$^2$ unexpanded thermoplastic particles of a second quality with an expansion temperature of 90° C. During the production of the semi-finished product, the impregnated mat was heated to 85° C. so that an expansion of the thermoplastic particles of the first quality took place. During a subsequent hot pressing, mutually superposed layers of this semi-finished product were pressed to form a plate with a thickness of 5 mm at a press-temperature of 135° C. and under a press-time of 5 minutes.

The invention is of course not in any way limited to the preferred embodiments described above. On the contrary, several possibilities to modifications thereof should be apparent to a person skilled in the art without thereby deviating from the basic idea of the invention as defined in the appended claims.

The invention claimed is:

1. A semi-finished product having the form of a web or sheet and capable of forming a polymeric foam composite material by heat treatment, which semi-finished product is formed by a web or sheet of fibrous material and a mixture comprising curable resin and unexpanded thermoplastic particles introduced into the fibrous material, wherein the mixture comprises at least two different unexpanded thermoplastic particles each having mutually different expansion temperatures and which remain unexpanded in the semi-finished product.

2. A semi-finished product according to claim 1, wherein some of the thermoplastic particles in said mixture having a first expansion temperature have been expanded after the introduction of the mixture into the web or sheet of fibrous material, whereas thermoplastic particles in the mixture having a second higher expansion temperature then the thermoplastic particles having said first expansion temperature remain unexpanded in the semi-finished product.

3. A semi-finished product according to claim 1, wherein the thermoplastic particles in said mixture comprise 0.1-70% by weight, preferably 0.5-50% by weight, of thermoplastic particles having a first lower expansion temperature than the rest of the thermoplastic particles in the mixture.

4. A semi-finished product according to claim 1, wherein it contains 10-70% by weight, preferably 15-60% by weight, of fibres.

5. A semi-finished product according to claim 1, wherein said fibrous material, as seen in its initial state, has a weight of 20-6000 g/m$^2$, preferably 30-3000 g/m$^2$.

6. A semi-finished product according to claim 1, wherein it contains 0.1-80% by weight, preferably 3-50% by weight, of thermoplastic particles.

7. A method for producing a semi-finished product having the form of a web or sheet and capable of forming, by heat treatment, a polymeric foam composite material, wherein a web or sheet of fibrous material is impregnated with a mixture comprising curable resin and at least two different unexpanded thermoplastic particles each having mutually different expansion temperatures and which are left unexpanded in the semi-finished product.

8. A method according to claim 7, wherein the impregnate web or sheet of fibrous material is subjected to heat so that this material, at least in the areas closest to its external surfaces, reaches a temperature which exceeds the expansion temperature of the unexpanded thermoplastic particles in said mixture having a first lower expansion temperature than the unexpanded thermoplastic particles in the mixture having a second higher expansion temperature, so that some of the thermoplastic particles having said first lower expansion temperature are made to expand, whereas thermoplastic particles having said second higher expansion temperature remain unexpanded.

9. A method according to claim 8, wherein the stickiness of the external surfaces of the impregnated web or sheet of fibrous material is reduced in that thermoplastic particles having said first lower expansion temperature are made to expand in the areas closest to the external surfaces of the impregnated web or sheet of fibrous material.

10. A method according to claim 9, wherein the impregnated web or sheet of fibrous material is subjected to drying in order to reduce its solvent content after the reduction of the stickiness of its external surfaces.

11. A polymeric foam composite material, formed by a semi-finished product according to claim 1, which has been subjected to heat and pressure so that final curing of the curable resin has taken place and remaining expansion of the thermoplastic particles has taken place.

12. A method for producing a polymeric foam composite material, formed by a semi-finished product having the form of a web or sheet and capable of forming a polymeric foam composite material by heat treatment, which semi-finished product is formed by a web or sheet of fibrous material and a mixture comprising curable resin and unexpanded thermoplastic particles introduced into the fibrous material, wherein the mixture comprises at least two different unexpanded thermoplastic particles each having mutually different expansion temperatures and which remain unexpanded in the semi-finished product, which is subjected to heat and pressure so that final curing of the curable resin takes place and remaining expansion of the thermoplastic particles takes place.

13. A plate, comprising at least one layer (1) of polymeric foam composite material formed by a semi-finished product having the form of a web or sheet and capable of forming a polymeric foam composite material by heat treatment, which semi-finished product is formed by a web or sheet of fibrous material and a mixture comprising curable resin and unexpanded thermoplastic particles introduced into the fibrous material, wherein the mixture comprises at least two different unexpanded thermoplastic particles each having mutually different expansion temperatures and which remain unexpanded in the semi-finished product and which has been subjected to heat and pressure so that final curing of the curable resin has taken place and remaining expansion of the thermoplastic particles has taken place.

14. A method for producing a plate comprising at least one layer (1) of a polymeric foam composite material, wherein a semi-finished product having the form of a web or sheet and capable of forming a polymeric foam composite material by heat treatment, which semi-finished product is formed by a web or sheet of fibrous material and a mixture comprising curable resin and unexpanded thermoplastic particles introduced into the fibrous material, wherein the mixture comprises at least two different unexpanded thermoplastic particles each having mutually different expansion temperatures and which remain unexpanded in the semi-finished product is placed in one or several layers, in a press device and is subjected to heat and pressure in the press device so that final curing of the curable resin of the semi-finished product takes place and remaining expansion of the thermoplastic particles of the semi-finished product takes place.

15. A semi-finished product according to claim 2, wherein the thermoplastic particles in said mixture comprise 0.1-70% by weight, preferably 0.5-50% by weight, of thermoplastic particles having the first lower expansion temperature than the rest of the thermoplastic particles in the mixture.

16. A semi-finished product according to claim 15, wherein it contains 10-70% by weight, preferably 15-60% by weight, of fibres.

17. A semi-finished product according to claim 2, wherein it contains 10-70% by weight, preferably 15-60% by weight, of fibres.

18. A semi-finished product according to claim 3, wherein it contains 10-70% by weight, preferably 15-60% by weight, of fibres.

19. A semi-finished product according to claim 18, wherein said fibrous material, seen in its initial state, has a weight of 20-6000 g/m$^2$, preferably 30-3000 g/m$^2$.

20. A semi-finished product according to claim 16, wherein said fibrous material, as seen in its initial state, has a weight of 20-6000 g/m$^2$, preferably 30-3000 g/m$^2$.

* * * * *